United States Patent [19]

McWhirter

[11] 4,419,785
[45] Dec. 13, 1983

[54] BOLT EYELET WITH BOLT-ENGAGING SHOULDER FOR ELECTRICAL TRANSMISSION LINES

[75] Inventor: Carson H. McWhirter, Birmingham, Ala.

[73] Assignee: Interpace Corporation, Whippany, N.J.

[21] Appl. No.: 332,951

[22] Filed: Dec. 21, 1981

[51] Int. Cl.³ .............................................. F16L 3/12
[52] U.S. Cl. ...................................... 16/1 R; 294/91;
411/400; D8/397
[58] Field of Search ............. 16/1 R, 1 C, 2; D8/367, D8/371, 382, 397; 411/378, 396, 400; 29/7; 248/339, 342, 343, 544; 403/164, 165; 294/78, 91; 59/85, 86, 93

[56] References Cited

U.S. PATENT DOCUMENTS

| 590,542 | 9/1897 | Gosnell | 294/91 |
| 1,060,210 | 4/1913 | Regan et al. | 294/91 |
| 1,452,127 | 4/1923 | Sitzman | 294/91 |
| 1,531,902 | 3/1925 | Cunningham | 294/91 |
| 2,662,791 | 12/1953 | Kittler | 294/91 |

Primary Examiner—Fred Silverberg
Attorney, Agent, or Firm—Charles E. Baxley

[57] ABSTRACT

The invention deals with a novel bolt eyelet design for use on high voltage transmission lines used by utilities. The eyelet incorporates a shoulder in the base that automatically centers the installed bolt when the latter is tightened.

3 Claims, 6 Drawing Figures

BOLT EYELET WITH BOLT-ENGAGING SHOULDER FOR ELECTRICAL TRANSMISSION LINES

BACKGROUND OF THE INVENTION

1. Field of the Invention

The present invention relates to high voltage transmission line fittings or hardware commonly found in electric utility systems. These fittings are manufactured by casting or forging and may be composed of ferrous or other suitable alloys.

2. State of the Prior Art

The invention specifically deals with a fitting called an eyelet which finds many uses in high voltage transmission lines. Conductors, cables and insulators and other components must be supported or attached to or at terminations and this fitting finds extensive use in this application. Typically, one side of the eyelet has a base with an elongated hole for a bolt whose diameter is generally on the order of $\frac{5}{8}''$ or $\frac{3}{4}''$. This elongated hole may cause eccentric loading of the eyelet and, therefore, its ultimate structural strength is reduced. As an example, pull tests on standard fittings show strength reduction of about 10% when tested with maximum eccentricity. As a result, additional material must be provided, in accordance with the engineering design of such eyelets, to insure adequate strength, a clear waste of material if the strength could be otherwise attained. Also, the elongated hole occasionally does not restrain the bolt head in a location that would rotationally lock the bolt head. This problem is especially common with the hexagonally shaped bolt head. As a result two tools are necessary to tighten the bolt and nut assembly when this condition occurs. The elongated hole is also disadvantageous in requiring extensive manufacturing operations such as core setting or punching.

SUMMARY OF THE INVENTION

The primary object of the present invention is to provide a bolt eyelet that eliminates the foregoing disadvantages of the current design eyelet. This is accomplished by the elimination of the elongated bolt hole and the addition of a bolt head restraining shoulder integrally formed in the base of the eyelet. The shoulder not only restrains the bolt head from turning but, in a reaction to this restraint, automatically centers the bolt in the fitting. A further advantage of the present invention is the provision of a bolt eyelet which is simple in design, inexpensive to manufacture, rugged in construction and easy to install.

DESCRIPTION OF THE PREFERRED EMBODIMENT

Figure 1:
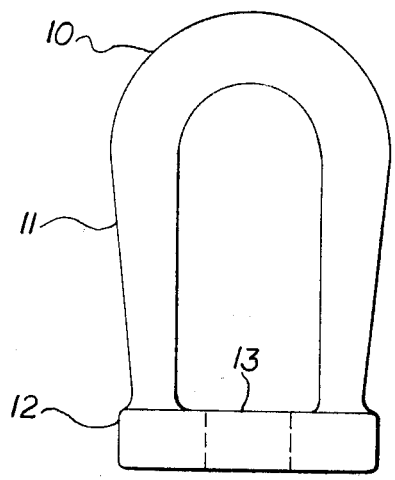
FIG. 1 is a front elevational view of a typical bolt eyelet of the prior art.
Figure 2:
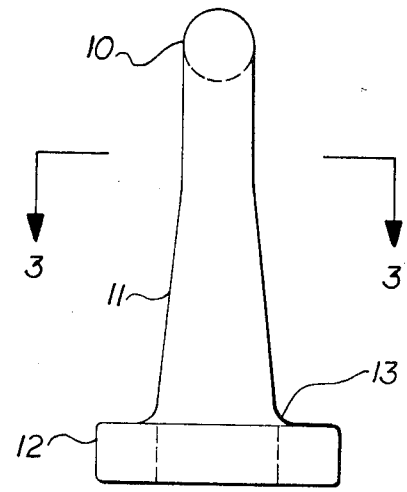
FIG. 2 is a side elevational view of the same bolt eyelet.
Figure 3:
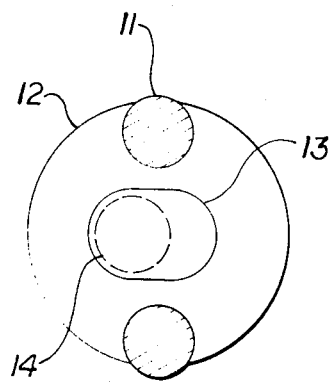
FIG. 3 is a sectional view along line 3—3 of FIG. 2.

Referring now to FIGS. 1, 2 and 3, there are shown three views of a state-of-the-art eyelet 10. Eyelet 10 includes a loop 11 integrally attached to base 12. Formed in the base during the production of the eyelet is elongated bolt hole 13. The elongation of the bolt hole 13 is necessary to allow the assembly of a bolt which, of necessity, must enter the hole from the side of the loop, and at an angle to the axis of the bolt hole. After assembly, bolt 14 (shown in phantom) may take any random position within the hole 13, but the engineer must design for the extreme position wherein the bolt 14 is at the end of the hole 14 as shown in FIG. 3, this being an eccentric position. In this maximum eccentric position, the test strengths are the lowest and must be used as the basis of design.

Figure 6:
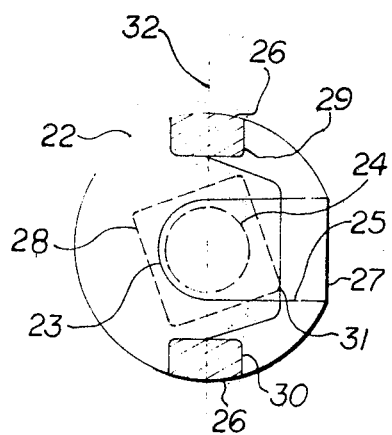
FIG. 6 is a sectional view along line 6—6 of FIG. 5.
Figure 4:
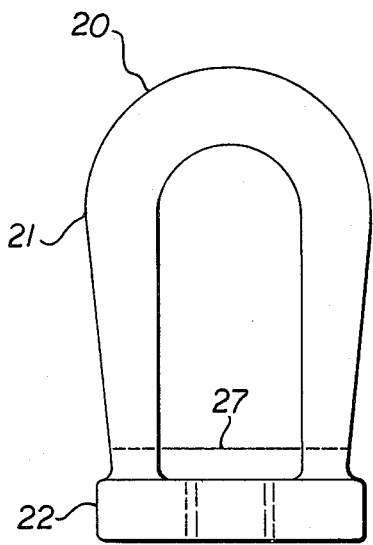
FIG. 4 is a front elevational view of a bolt eyelet including a shoulder in accordance with the invention.
Figure 5:
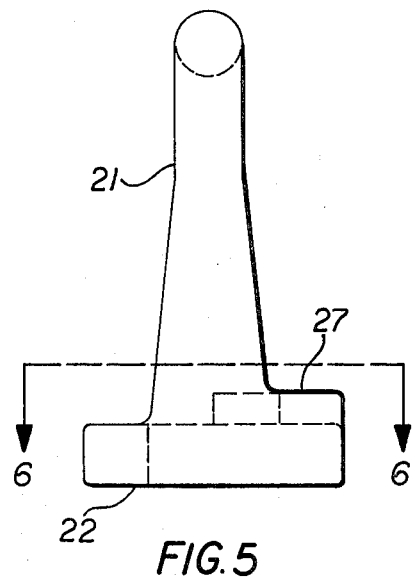
FIG. 5 is a side elevational view of the same bolt eyelet.

The loss of strength and other shortcomings of the prior art associated with the foregoing eccentric position is overcome by the eyelet of the invention as shown in the three views of FIGS. 4, 5 and 6. Eyelet 20 includes loop 21 integrally attached to base 22. As more clearly shown in FIG. 6, the base 22 includes a generally horse-shoe shaped section 23. The location of the closed portion of the horse-shoe section 23 provides for a centering of the bolt 24 (shown in phantom) axially in the eyelet. The opening 25 of the horse-shoe section 23 is centered between legs 26 of the loop 21. This configuration provides for easy assembly of the bolt which again must enter the eyelet at an angle.

Integrally formed with the base 22 is shoulder 27. Shoulder 27 is located in the plane of the assembled bolt head 28 and closes the opening 25 in the base 22. Optionally, the opening 25 may extend to the bottom ends of loop 21 at locations 29 and 30. The unique characteristics of the instant invention are easily seen by the location of the bolt head 28 (FIG. 6) with respect to the opening 25 in base 22. As a nut (not shown) is turned and tightened on bolt 24, the bolt head 28 would tend to rotate counterclockwise as viewed in FIG. 6 resulting in contact between the bolt head 28 and shoulder 27 at point 31. In reaction to the force of this contact, the bolt 24 is urged by the shoulder 27 in the direction of the closed portion of the horse-shoe section 23 to establish and maintain alignment of the bolt 24 in common with the loop legs 26 along axis 32. As a result, the material used in constructing the eyelet 20 need not be derated for an additional safety factor in the design. A bolt with a square head has been shown; however, with hex-shaped bolt heads or other shapes, a proper shoulder profile may be designed to effect the same end result.

What has been described is an improved bolt eyelet that can be used as the equivalent of prior art designs but will have a lower cost, save material and provide other advantages as set forth above. Those skilled in the art will recognize that other embodiments are possible by various changes in structure, without departing from the spirit and scope of the invention. Accordingly, the invention is not to be regarded as limited to the embodiment disclosed herein, but is to be limited only as defined by the appended claims.

I claim:

1. A bolt eyelet in combination with a bolt having a stem, a head and a longitudinal axis comprising:
   a U-shaped loop having an axis and loop ends;
   a horseshoe shaped base disposed in a plane generally perpendicular to a central plane of said loop and integrally formed with said loop, said base having U-shaped aperture for receiving said stem of said bolt, said aperture having a semicircular end and being elongated in a transverse direction normal to the central plane of said loop, the length of said aperture being greater than a cross section of said bolt head, the loop ends being attached to said base at opposite ends of a diameter of the semicircular and of said aperture in the same plane as the central plane of the loop and wherein said base includes a shoulder, said shoulder and said loop being disposed on the same side of said base, said shoulder being positioned above and spanning across an end of said aperture located away from said ends of said loop to provide space for the entry of said bolt prior to a securing of said bolt to said eyelet;

whereby upon the placing of said bolt into position in the eyelet, the bolt head will be in the same plane as the shoulder and during a normal tightening of the bolt, the head will contact the shoulder to automatically align the bolt axis with the central plane of the loop and the loop axis and thereby facilitate the tightening and positioning of the bolt.

2. The bolt eyelet in accordance with claim 1 wherein the shoulder is shaped to conform with the shape of the bolt head to react therewith.

3. The bolt eyelet in accordance with claim 1 wherein the shoulder is shaped to react with a square headed bolt.

* * * * *